(12) United States Patent
Kim et al.

(10) Patent No.: US 7,439,904 B2
(45) Date of Patent: Oct. 21, 2008

(54) RANGING SYSTEM AND METHOD THEREOF

(75) Inventors: Jae-hyon Kim, Suwon-si (KR);
Joonhyuk Kang, Daejeon (KR);
Young-hwan Kim, Hwaseong-si (KR);
Yungil Kim, Daejeon (KR); Hyounkuk Kim, Daejeon (KR); Jaeseung Son, Daejeon (KR); Hyuncheol Park, Daejeon (KR)

(73) Assignee: Samsung Electronics Co., Ltd., Suwon (KR)

( * ) Notice: Subject to any disclaimer, the term of this patent is extended or adjusted under 35 U.S.C. 154(b) by 368 days.

(21) Appl. No.: 11/401,416

(22) Filed: Apr. 11, 2006

(65) Prior Publication Data

US 2006/0258298 A1    Nov. 16, 2006

Related U.S. Application Data

(60) Provisional application No. 60/680,488, filed on May 13, 2005.

(30) Foreign Application Priority Data

Dec. 5, 2005    (KR) ............... 10-2005-0117702

(51) Int. Cl.
*G01S 13/08* (2006.01)
*G01S 13/00* (2006.01)

(52) U.S. Cl. ...................... 342/118; 342/145
(58) Field of Classification Search ............... 342/118, 342/125, 128, 145, 175, 200–204
See application file for complete search history.

(56) References Cited

U.S. PATENT DOCUMENTS 4,028,699 A * 6/1977 Stevens ............... 342/108

4,053,888 A * 10/1977 Robin et al. ............... 342/89

(Continued)

OTHER PUBLICATIONS

Development of a chaotic signal radar system for vehicular collision-avoidance Hara, Y. Hara, T. Seo, T. Yanagisawa, H. Ratliff, P. Machowski, W. Mitsubishi Electr. Corp., Kamakura; Radar Conference, 2002. Proceedings of the IEEE pp. 227-232.*

(Continued)

*Primary Examiner*—Thomas H. Tarcza
*Assistant Examiner*—Peter M Bythrow
(74) *Attorney, Agent, or Firm*—Sughrue Mion, PLLC (57) ABSTRACT

A ranging system and ranging method are provided. The ranging system includes a transmission signal generator which generates a transmission signal, which is transmitted from a transmission device to a reception device; a correction signal generator which converts the transmission signal, which is processed in the reception device and re-input to the transmission device, into a correction signal; a reference signal generator which generates a reference signal, an overlap detector which detects an overlap region between the correction signal and the reference signal; a time calculator which calculates a transmission time of the transmission signal; and a distance calculator which calculates a distance between the devices using the transmission time. The method includes generating a transmission signal; transmitting the transmission signal to a reception device and receiving the signal back again; producing a correction signal; detecting an overlap region between the correction and reference signals; calculating a transmission time; and calculating a distance between the transmission and reception devices.

34 Claims, 8 Drawing Sheets

U.S. PATENT DOCUMENTS

| | | | |
|---|---|---|---|
| 4,132,991 A * | 1/1979 | Wocher et al. | 342/134 |
| 5,321,409 A * | 6/1994 | Walker | 342/202 |
| 5,414,729 A * | 5/1995 | Fenton | 375/149 |
| 5,959,571 A * | 9/1999 | Aoyagi et al. | 342/70 |
| 6,310,906 B1 * | 10/2001 | Abarbanel et al. | 375/130 |
| 6,331,974 B1 * | 12/2001 | Yang et al. | 370/342 |
| 6,614,388 B2 * | 9/2003 | Klinnert et al. | 342/70 |
| 6,738,313 B2 * | 5/2004 | Fortuna et al. | 367/100 |
| 6,795,491 B2 * | 9/2004 | Fleming et al. | 375/213 |
| 6,859,165 B2 * | 2/2005 | Matsuoka | 342/118 |
| 7,216,047 B2 * | 5/2007 | Szajnowski | 702/79 |
| 2006/0214840 A1 * | 9/2006 | Kim et al. | 342/118 |
| 2007/0230701 A1 * | 10/2007 | Park et al. | 380/263 |

OTHER PUBLICATIONS

Chaotic radar systems Sobhy, M.I.; Shehata, A.R.; Microwave Symposium Digest., 2000 IEEE MTT-S International vol. 3, Jun. 11-16, 2000 pp. 1701-1704 vol. 3 .*

* cited by examiner

REFERENCE PULSE

FIG. 2B
(PRIOR ART)

RECEIVED TRANSMISSION PULSE

RANGING SYSTEM AND METHOD THEREOF

CROSS-REFERENCE TO RELATED APPLICATION

This application claims benefit under 35 U.S.C. § 119(a) of Korean Patent Application No. 10-2005-0117702, filed Dec. 5, 2005 in the Korean Intellectual Property Office, the entire contents of which are incorporated herein by reference. This application also claims the benefit of priority from U.S. Provisional Patent Application No. 60/680,488, filed May 13, 2005 in the U.S. Patent and Trademark Office, the entire contents of which are herein incorporated by reference.

BACKGROUND OF THE INVENTION

1. Field of the Invention

The present invention relates to a ranging system and a method thereof. More particularly, the present invention relates to a ranging system to accurately measure a distance between two devices and reduce power consumption and channel occupancy in transmitting a transmission pulse and a method thereof.

2. Description of the Related Art

In the IEEE 802.15.4 standards, a full function device (FFD) and a reduced function device (RFD) are suggested. In the FFD, wireless communication between two devices may occur without a carrier; but in the RFD, wireless communication between two devices requires a carrier.

Figuring out a location by communicating with another device using FFD and RFD methods is called localization. All the functions of a physical layer to measure a relative distance between devices upon executing the localization function are called ranging technology. The ranging technology offers a key reference to utilize information obtained through communications by efficiently forming networks.

There are a single trip method and a round trip method for the ranging technology.

A single trip method measures how long it takes to transmit an RF signal using an absolute time between a transmission device transmitting the RF signal and a reception device, and calculates a distance between the two devices using the time.

A round trip method calculates a distance between two devices using how long it takes for the RF signal to go and return between the two devices, if an RF signal transmitted from a transmission device is processed in a reception device and re-received to the transmission device. In the case of the round trip method, a round trip time of the RF signal includes a time for processing the RF signal in the reception device and the processing time can be simply calculated according to the device features. Accordingly, if the processing time is subtracted from the round trip time of the RF signal and then multiplied by ½, the result is the one-way moving time of the RF signal between the two devices. So, by multiplying this time by the speed of light, the distance between the two devices may be calculated.

Figure 1:
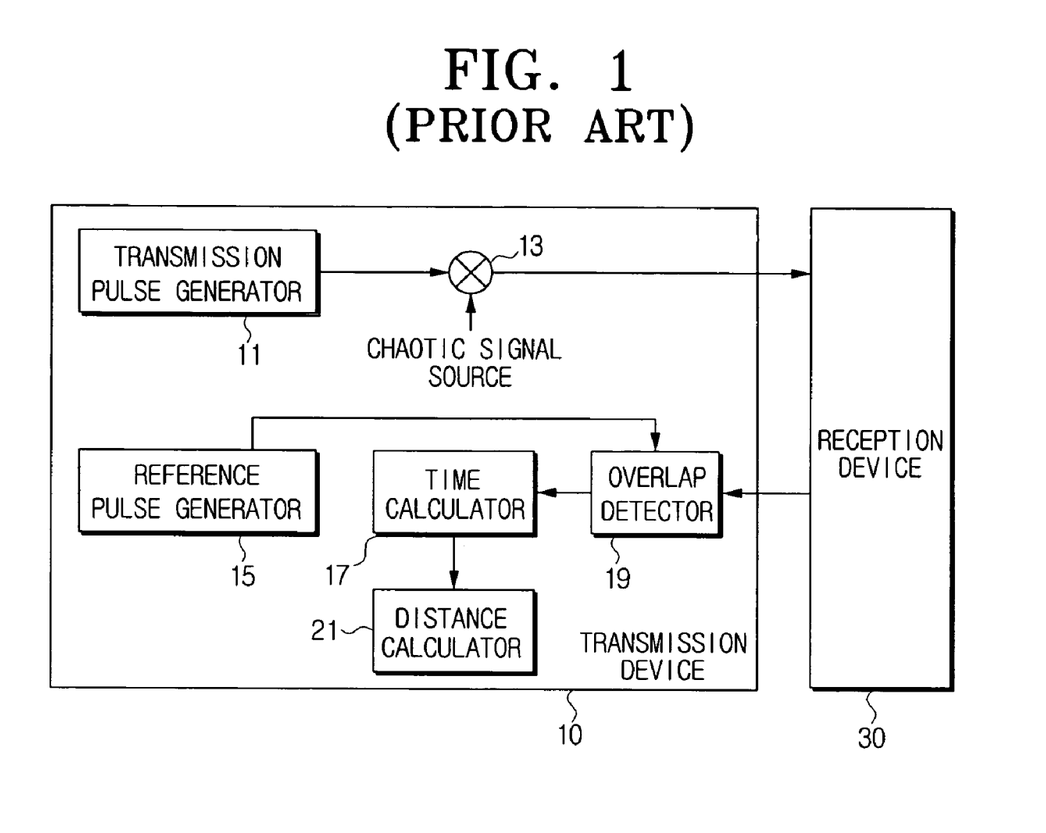
FIG. 1 is a block diagram showing a conventional ranging system.

A certain signal delay occurs in the RF signal going and turning between the two devices. To measure the distance between the two devices considering the delay, each device includes a transmission pulse generator 11, a multiplier 13, a reference pulse generator 15, a time calculator 17, an overlap detector 19 and a distance calculator 21 as shown in FIG. 1.

The transmission pulse generator 11 generates a transmission pulse at a preset frequency, for example, at 2.5125 MHz, to transmit to a reception device.

The multiplier 13 multiplies the transmission pulse generated from the transmission pulse generator 11 by a chaotic signal source to convert the transmission pulse into a chaotic signal.

Figure 2A:
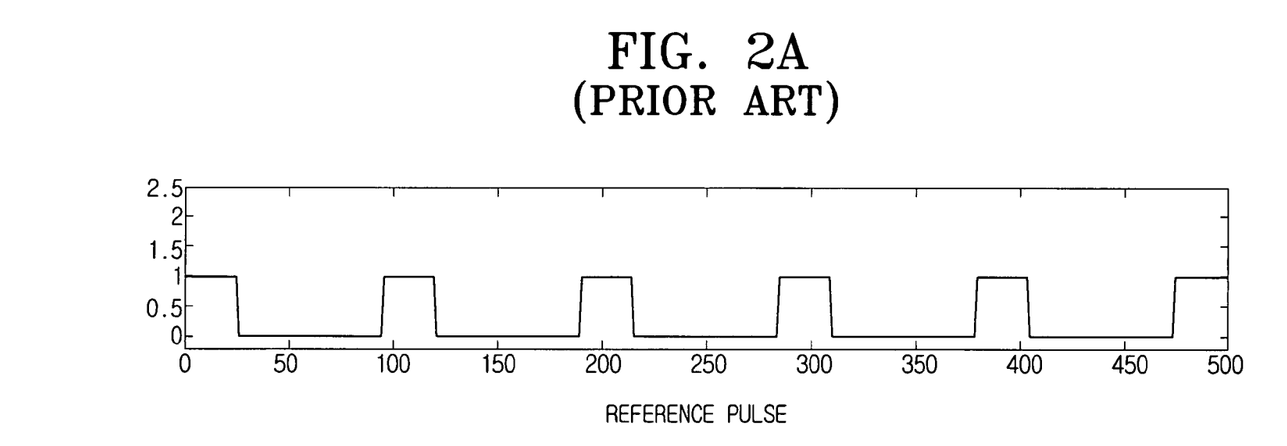
FIG. 2A shows a waveform of a reference pulse generated in a transmission device of a conventional ranging system.

The reference pulse generator 15 generates a reference pulse to compare with the transmission pulse which is processed and returned from the reception device. The reference pulse has a certain frequency width different from the transmission pulse. For example, the reference pulse generator 15 generates a reference pulse at 5.125 MHz as shown in FIG. 2A.

The transmission pulse generator 11 and the reference pulse generator 15 generate the transmission pulse and reference pulse at the same time. The transmission pulse is transmitted to the reception device, but the reference pulse is not externally transmitted.

The overlap detector 19 compares the reference pulse in the transmission device and the transmission pulse re-transmitted from the reception device, and detects a region where the reference pulse and the transmission pulse overlap each other. The reference pulse and the transmission pulse have a frequency difference of 0.0125 MHz. Accordingly, if no delay between the reference pulse and the transmission pulse occurs, the reference pulse and the transmission pulse overlap each other at a certain earlier region. However, if a delay occurs between the reference pulse and the transmission pulse, a region where the reference pulse and the transmission pulse overlap each other can be another region instead of the earlier region. The overlap detector 19 detects the region where the reference pulse and the transmission pulse overlap to determine how long the transmission pulse is delayed.

The time calculator 17 counts (1) the number of pulses between the moment when the transmission pulse is transmitted to the reception device and right before the returned transmission pulse and the reference pulse overlap each other, (2) the number of pulses between the moment when the transmission pulse returns to the transmission device and the moment when the returned transmission pulse and the reference pulse overlap each other, and (3) the number of pulses while the returned transmission pulse and the reference pulse overlap each other. Using each of the counted numbers, a transmission time of the transmission pulse moving between the transmission device and reception device is calculated, and a time required to process the transmission pulse in the reception device has to be considered.

The distance calculator 21 calculates a distance between the two devices using the transmission time calculated in the time calculator 17, the speed of light, and the transmission pulse in the reception device.

Figure 2B:
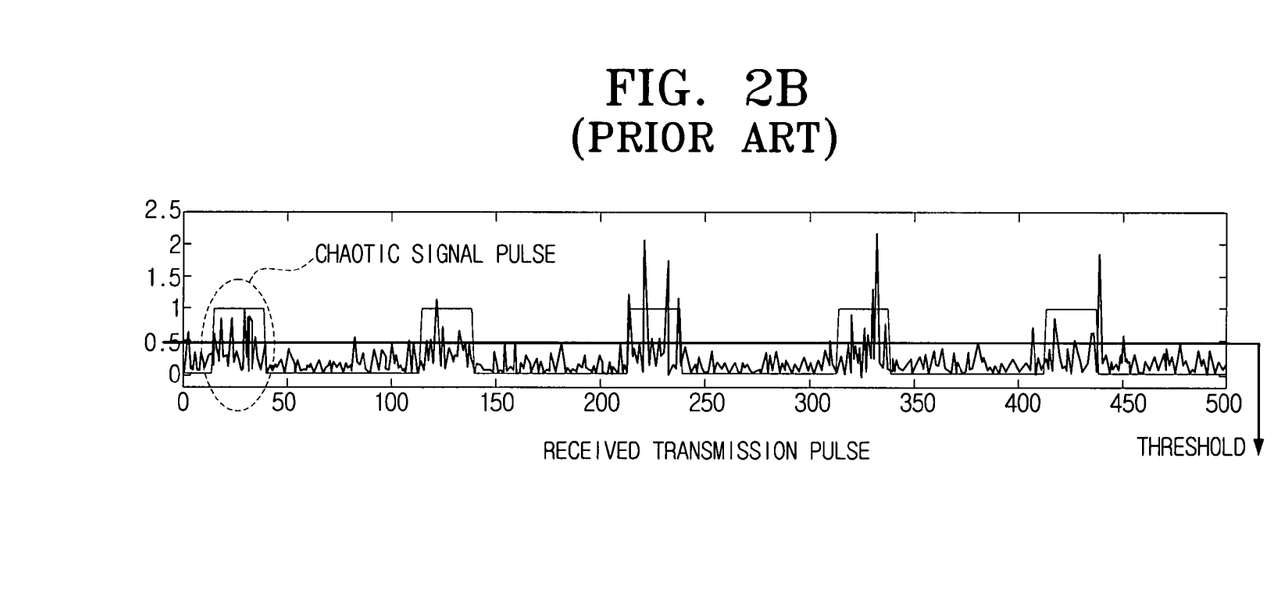
FIG. 2B shows a waveform of a transmission pulse transmitted from a reception device of a conventional ranging system.

However, the re-transmitted transmission pulse is a chaotic pulse and is influenced by noise generated during the process of the reception device and multi-path channels. Accordingly, when the shape of each pulse of the transmission pulse is determined using a threshold as shown in FIG. 2, accuracy decreases. Due to inaccuracy of reception of the transmission pulse, a region where the transmission pulse and the reference pulse overlap each other is different every pulse so that the counted number can be different from reality. Therefore, it is difficult to accurately measure the delay and a relative distance between two devices.

Meanwhile, 250 transmission pulses are needed to measure a distance using the transmission pulse, and a large amount of power is consumed to transmit the 250 transmission pulses. In addition, channels are occupied during the transmission of the 250 transmission pulses so that a time for occupying channels is long. For example, when an RF signal is transmitted at 2.5 Mbps, channels are occupied during 400 ns*250*2(round trip)=200 us.

Therefore, there is a need for a method of accurately measuring a distance by accurately determining each pulse of the received transmission pulses. In addition, there is a need for a method of reducing power consumption and channel occupancy when transmitting a transmission pulse.

SUMMARY OF THE INVENTION

An aspect of the present invention is to provide a ranging system to accurately measure a distance between two devices and a method thereof.

In order to achieve the above and other aspects of the present invention, there is provided a ranging system and a method thereof to reduce power consumption and channel occupancy in transmitting a transmission pulse.

According to an aspect of the present invention, a ranging system comprises a transmission signal generator which is configured to generate a transmission signal, formed of a chaotic signal, which is transmitted from a transmission device to a reception device; a correction signal generator which is configured to convert the transmission signal, which is processed in the reception device and re-input to the transmission device, into a correction signal; a reference signal generator which is configured to generate a reference signal to be compared with the correction signal, the reference signal having a certain frequency difference from the transmission signal; an overlap detector which is configured to detect a pulse region where the correction signal and the reference signal overlap each other; a time calculator which is configured to calculate a transmission time of the transmission signal between the transmission device and the reception device, using at least one among a time from the transmission of the transmission signal from the transmission device until right before overlap of a returned transmission signal and the correction signal, a time from the reception of the transmission signal at the transmission device until right before overlap of the correction signal and the reference signal, and a time while the correction signal and the reference signal overlap each other; and a distance calculator which is configured to calculate a distance between the transmission device and the reception device using the transmission time and a transmission rate of the transmission signal.

The ranging system may comprise a synchronizer which is configured to synchronize the transmission signal to determine a start point of the transmission signal received by the transmission device.

The correction signal may be of a standardized waveform, and the reference signal may be generated at the same time as the transmission signal.

The correction signal generator may generate the correction signal with the same frequency and signal section as the transmission signal, using the start point of the transmission signal determined by the synchronizer.

The correction signal generator may form the correction signal which is a certain amount of time longer than the transmission signal.

The correction signal generator may be a correction pulse generator generating a correction pulse of a square wave as the correction signal.

The transmission signal generator may be a transmission pulse generator generating a transmission pulse of a square wave as the transmission signal, and the transmission pulse generator may further comprise a multiplier which is configured to multiply the transmission pulse by a chaotic signal source.

The ranging system may further comprise a preamble transmitter which is configured to transmit a preamble of the transmission pulse generated from the transmission signal generator.

The preamble may comprise a packet sensing part which is configured to sense a start of the transmission pulse, a bit synchronization part which is configured to synchronize the transmission signal, and a notification part which is configured to show a start of a start of frame delimiter which reports a start of data.

The packet sensing part may consist of plural '1' signals, and may further comprise a packet sensor which is configured to sense reception of a packet using the packet sensing part.

The bit synchronization part may be formed repeating a plurality of bits of a process unit and the process unit may be formed of '01111'. The plurality of bits may be repeated a plurality of times.

The synchronizer may synchronize the preamble by processing the process unit in one of a single window method or a double window method.

The reference signal generator may be a reference pulse generator generating a reference pulse as the reference signal with a same signal section as the transmission signal.

The time calculator may comprise an N3 counter which is configured to count a number of pulses (N3) from the generation of the transmission signal until right before overlap of the returned transmission signal and the correction signal; an N1 counter which is configured to count a number of pulses (N1) from the reception of the transmission signal until right before overlap of the correction signal and the reference signal; and an N2 counter which is configured to count a number of pulses (N2) while the correction signal and the reference signal overlap each other.

The time calculator can calculate the transmission time by Equation 1:

$$T'_x = \frac{(N3 + 0.5*N2)}{f_1} - \frac{(N1 + 0.5*N2)}{f_0} - T_s$$

where $f_1$ is a frequency of the reference signal, $f_0$ is a frequency of the transmission signal, and $T_S$ is a time to execute synchronization in the synchronizer.

The distance calculator can calculate the distance between the transmission device and the reception device by Equation 2:

$$S=0.5*c*(T'_x-\tau_0)$$

where $\tau_0$ is a processing time required by the reception device.

The processing time may be a time from reception of the transmission signal at the reception device to re-transmission of the transmission signal.

According to another aspect of the present invention, a ranging method includes generating a transmission signal, which is formed of a chaotic signal, and a reference signal having a certain frequency difference from the transmission signal; transmitting the transmission signal to a reception device; receiving the transmission signal from the reception device; converting the transmission signal which is received from the reception device into a correction signal; comparing the correction signal and the reference signal, and detecting a pulse region where the correction signal and the reference signal overlap each other; calculating a transmission time of the transmission signal between the transmission device and the reception device, using at least one among a time from the transmission of the transmission signal from the transmission device until right before overlap of the received transmission signal and the reference signal, a time from the reception of the transmission signal at the transmission device until right before overlap of the correction signal and the reference signal, and a time while the correction signal and the reference signal overlap each other; and calculating a distance between the transmission device and the reception device using the transmission time and a transmission rate of the transmission signal.

BRIEF DESCRIPTION OF THE DRAWINGS

The above and other aspects of the present invention will become more apparent by describing in detail exemplary embodiments thereof with reference to the attached drawing figures, wherein.

DETAILED DESCRIPTION OF THE EXEMPLARY EMBODIMENTS

Hereinafter, an exemplary embodiment of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
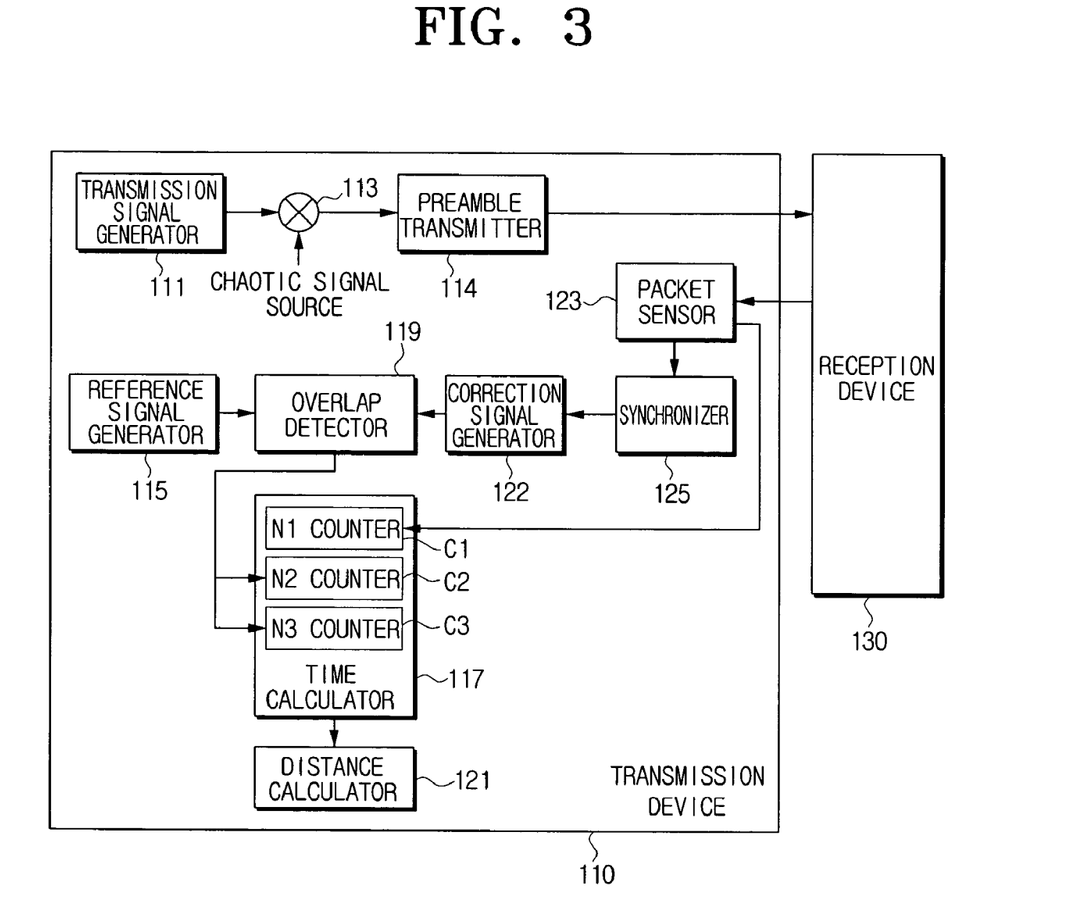
FIG. 3 is a block diagram showing a ranging system according to an exemplary embodiment of the present invention.

FIG. 3 is a block diagram showing a ranging system according to an exemplary embodiment of the present invention. Referring to FIG. 3, the ranging system includes a transmission signal generator 111, a multiplier 113, a preamble transmitter 114, a reference signal generator 115, a packet sensor 123, a time calculator 117, a synchronizer 125, a correction signal generator 122, an overlap detector 119 and a distance calculator 121.

The transmission signal generator 111 generates a transmission signal with a certain frequency and a signal section. The certain frequency may be preset, and the transmission signal may be a pulse signal/square wave. The transmission signal generator 111 according to an exemplary embodiment of the present invention generates a transmission signal of 2.5 MHz.

The multiplier 113 multiplies the transmission signal generated from the transmission signal generator 111 by a chaotic signal source to convert the transmission signal into a chaotic signal.

The preamble transmitter 114 separates a preamble of 32 bits from the transmission signal converted into the chaotic signal and transmits only the preamble to the reception device.

Figure 4:
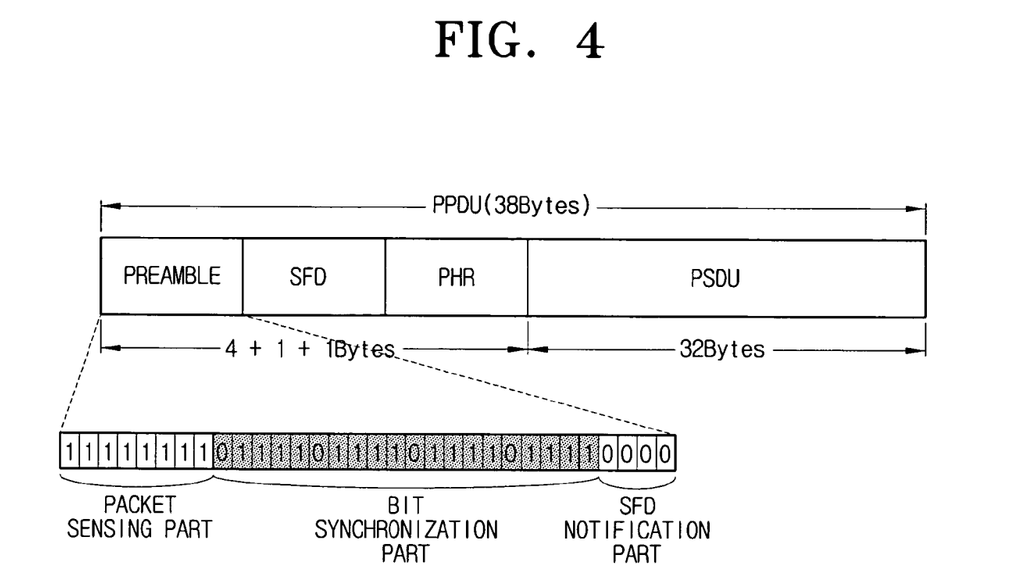
FIG. 4 is a block diagram showing a preamble used as a transmission pulse according to an exemplary embodiment of the present invention.

Generally, as shown in FIG. 4, a packet consists of a preamble of 4 bytes, a start of frame delimiter (SFD) of 1 byte, a packet header (PHR) of 1 byte and a PHY service data unit (PSDU) of 32 bytes. The preamble is used to synchronize an input signal and the SFD shows the end of a preamble and the start of a data packet. The PHR shows the number of bytes of data included in the PSDU.

The preamble consists of a packet sensing part, a bit synchronization part and a SFD notification part.

The packet sensing part has 8 bits consisting of consecutively arranged '1' signals of 8 bit to report packet transmission. The bit synchronization part has 20 bits consisting of 4 times repeatedly of '01111', i.e. '01111 01111 01111 01111', with 5 bits to synchronize the bit. '01111' is a processing unit on bit synchronization. The SFD notification part has 4 bits consisting of '0000' to report SFD reception.

Figure 7A:
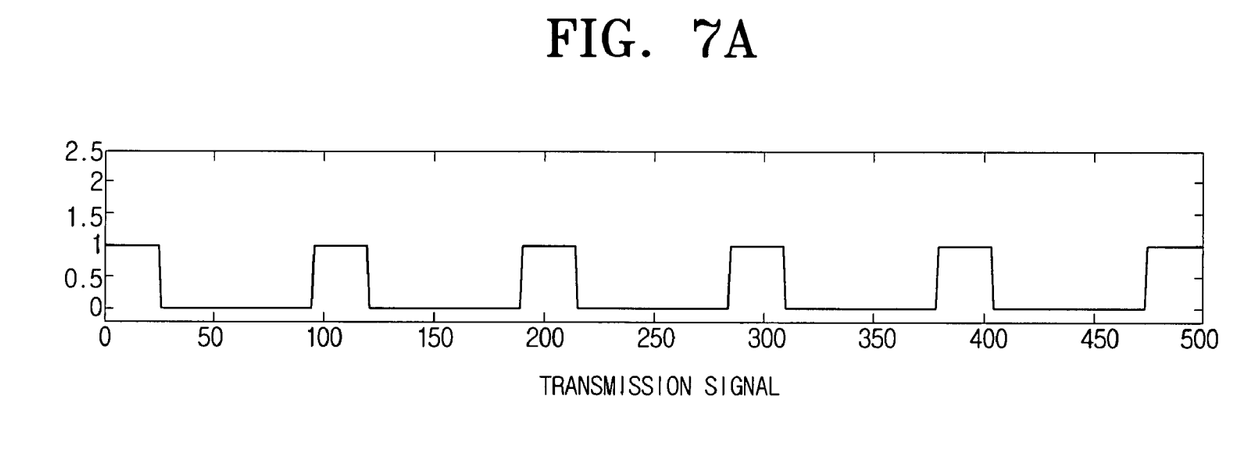
FIG. 7A shows a waveform of a reference pulse generated in a transmission device of a ranging system according to an exemplary embodiment of the present invention.

The reference signal generator 115 generates a reference signal to compare with the transmission signal returned from the reception device as shown in FIG. 7A. The reference signal may be a pulse/square wave. The reference signal has the same signal section as the transmission signal, but a frequency of the reference signal is 2.5125 MHz different from the transmission pulse. The reference signal is not transmitted to the outside.

The packet sensor 123 senses the transmission signal returned from the reception device and senses input of the transmission pulse using the packet sensing part of the first 8 bits of the preamble. The packet sensor 123 uses a double window method to sense a packet. Each window has an integration section as much as a signal section of a pulse column and the integration section can vary according to the rate of data transmission. In the double window method, the value of 1+SNR can be obtained using the rate of power between both window by sliding double windows.

The reason why the double window method is used to sense a packet is that although the reception end does not know the exact SNR value, a threshold can be automatically corrected using SNR information in the process of sliding. As a chaotic on-off keying (COOK) method is used on pulse column transmission, the threshold takes for convenience the intermediate value of power between a section with a pulse and a section without a pulse. Sensing a packet, the packet sensor 123 determines to complete packet sensing if there are 8 sections in which the power rates of both windows are higher than the threshold.

The synchronizer 125 performs symbol synchronization for accurate synchronization of a packet using the 20 bits of a bit synchronization part of a preamble. Synchronization is performed by applying the threshold calculated from the packet sensor 123 to the single window method.

Figure 6:
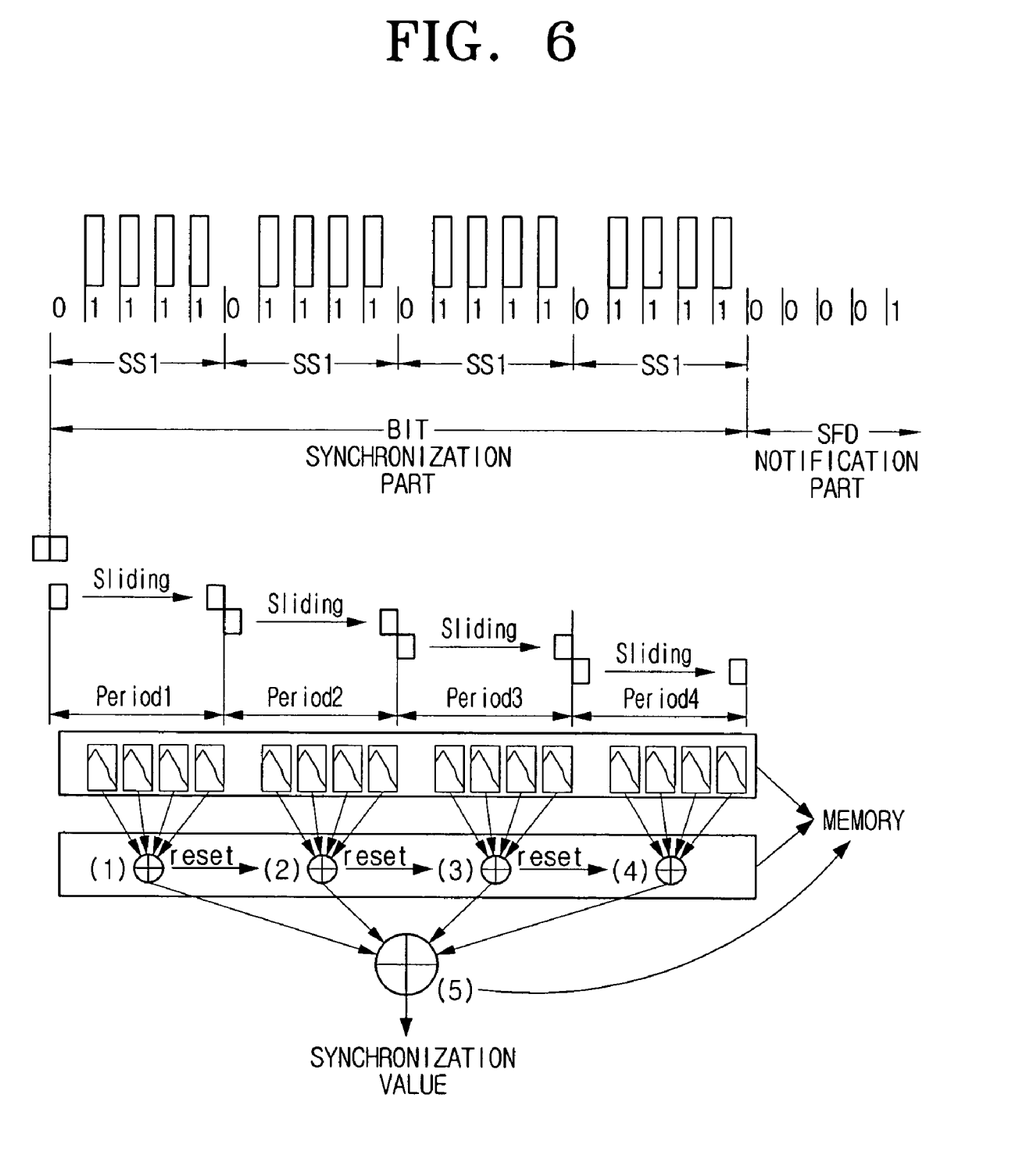
FIG. 6 is a view of the construction showing the process of simple method used in a synchronizer according to an exemplary embodiment of the present invention.

There are two kinds of methods for the symbol synchronization process performed in the synchronizer 125. One is a complex method and the other a simple method as shown in FIG. 6.

In the complex method, when '0' first comes after packet sensing, the double window is switched to the single window. The results of integration of a sliding window for the following 4 symbols of '1' are individually stored in different memories. If '0' comes after the 4 symbols of '1', the average of the results of integration stored in the 4 memories is stored in a new memory and this process is repeated 4 times. Lastly, the average of the averages of the 4 symbols stored in the 4 new memories is taken. Consequently, the average of integration of total 16 symbols can be obtained. Because the difference between the start point of the bit synchronization part and the maximum value can be found from the final average, the accurate start point of a symbol can be obtained. The complex method has accuracy when a chaotic signal pulse is used.

In the simple method, the synchronization process is the same as that in the complex method. In the case of the complex method, all integration values of a sliding window are stored in memories. However, in the case of the simple method, only the time difference between the maximum value and synchronization point for each symbol is stored. Accordingly, the simple method decreases the complexity of the complex method.

Figure 7B:
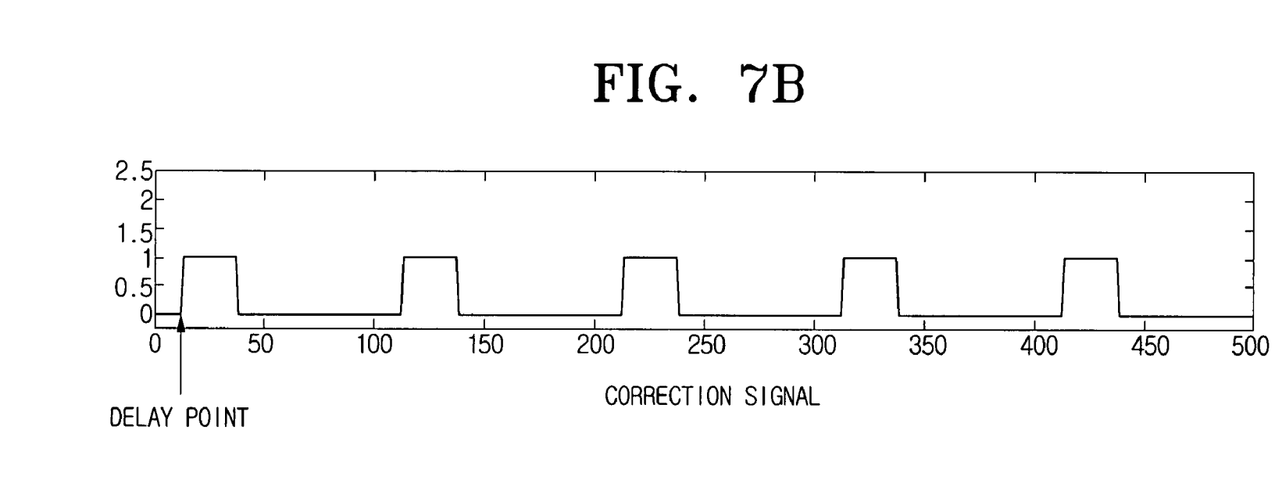
FIG. 7B shows a waveform of a correction pulse which a transmission pulse, transmitted from a reception device of a ranging system according to an exemplary embodiment of the present invention, is converted into.

The correction signal generator 122 converts a transmission signal in the form of a chaotic signal into a correction signal. The correction signal may be a pulse/square wave. The correction signal generator 122 converts the transmission signal using the start point of a packet detected from the synchronizer 125, and repeatedly forms the correction signal long enough until the correction signal and the reference signal finishes overlap as shown in FIG. 7B. A signal section of each pulse column of the correction signal is formed in the same form as a signal section of the transmission signal. The correction signal generator 122 converts the transmission signal into the correction signal and generates the correction signal longer than the transmission signal. So, although the transmission signal is formed of only 32 bits of a preamble, it is possible to compare the transmission signal with the reference signal so that a distance between two devices can be measured.

The overlap detector 119 detects signals where the reference signal generated in the transmission device and the correction signal generated from the correction signal generator 122 start overlap and finish overlap. If the overlap detector 119 detects the start of overlap, a N2 counter C2 operates to calculate the number of pulses where the reference signal and the correction signal overlap each other.

Figure 5:
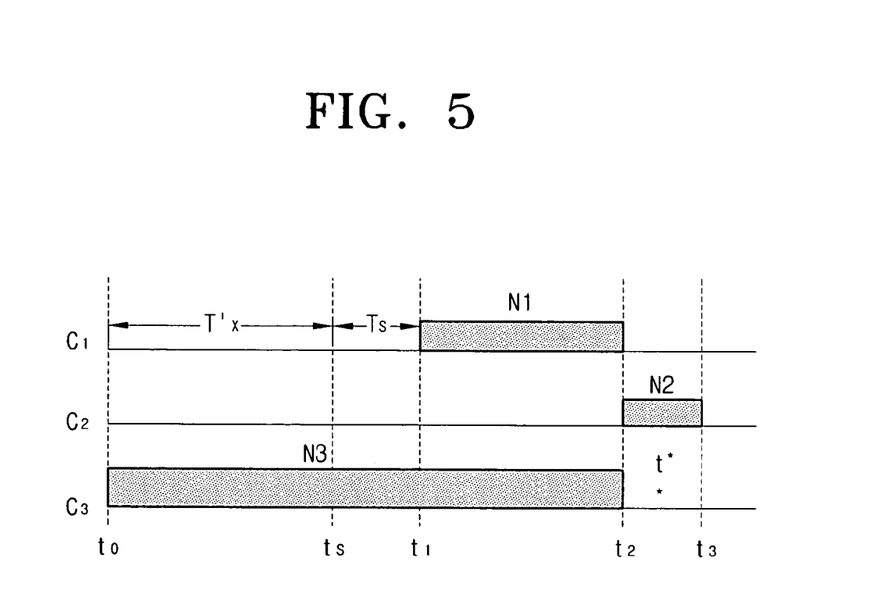
FIG. 5 is a block diagram showing each time counted in each of counters of a time calculator according to an exemplary embodiment of the present invention.

The time calculator 117 counts a transmission time, how long it takes to transmit the transmission signal from the transmission device to the reception device, and includes an N1 counter C1, an N2 counter C2 and an N3 counter C3. As shown in FIG. 5, the N3 counter C3 counts the number of pulses N3 from the moment of the transmission signal is transmitted from the transmission device to right before overlap of the returned transmission signal and the reference signal. The N1 counter C1 counts the number of pulses N1 from the moment when the returned transmission signal arrives at the transmission device to right before overlap. The N2 counter C2 counts the number of pulses N2 while the returned transmission signal and the reference signal overlap each other.

The time calculator 117 inputs N1, N2 and N3 from each counter to Equation 1 to count a transmission time Tx of the transmission pulse between the two devices.

$$T'_x = \frac{(N3 + 0.5*N2)}{f_1} - \frac{(N1 + 0.5*N2)}{f_0} - T_s \qquad \text{[Equation 1]}$$

, where $f_1$ is the frequency of the reference signal, $f_0$ is the frequency of the transmission signal, and Ts is the time that it takes to execute synchronization in the synchronizer 125. The reason why Ts is subtracted is that the N1 counter C1 operates after executing synchronization.

The distance calculator 121 calculates a distance between two devices using a transmission time obtained from the time calculator 117 and the number of pulses calculated from the overlap detector 119. First, the distance calculator 121 calculates a distance between two devices by inputting a transmission time T'x counted from the time calculator 117 to Equation 2.

$$S=0.5*c*(T'_x-\tau_0) \qquad \text{[Equation 2]}$$

, where $\tau_0$ is a processing time when the transmission pulse is processed to re-transmit to the transmission device after the reception device receives the transmission pulse from the transmission device and the processing time is previously promised between the two devices.

Figure 8:
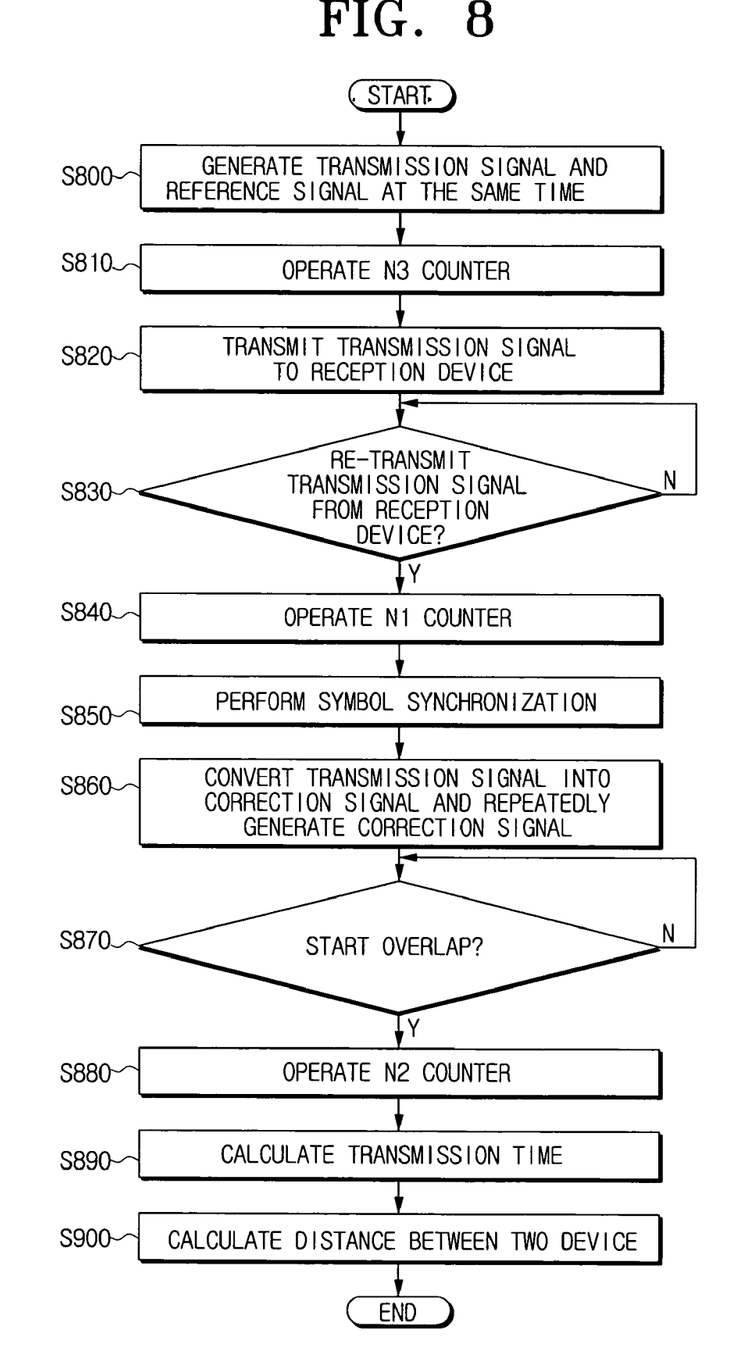
FIG. 8 is a flow chart showing the ranging process according to an exemplary embodiment of the present invention.

Hereinafter, the process of calculating a distance between two devices by a ranging system according to the above configuration will be described with reference to FIG. 8.

The transmission signal generator 111 and the reference signal generator 115 of a transmission device operate at the same time to generate a transmission signal and a reference signal (S800), and the N3 counter C3 operates (S810). The transmission signal is converted into a chaotic signal through the multiplier 113 and only a preamble is transmitted to a reception device (S820). The N3 counter C3 counts the number of pulses N3 from the moment of re-transmitting a transmission signal from the reception device to right before overlap of the returned transmission signal and the reference signal.

The transmission signal is processed in the reception device and is re-transmitted to the transmission device (S830). The N1 counter C1 of the transmission device counts the number of pulses N1 from the moment when the returned transmission signal arrives at the transmission device to right before overlap of the returned transmission signal and the reference signal (S840). The synchronizer 125 performs symbol synchronization using a bit synchronization part of the transmission signal (S850). If synchronization is finished, the start pulse of the transmission signal is found and the transmission signal, which is a chaotic signal, is converted into a correction signal of a square wave using the start point.

Subsequently, the correction signal is repeatedly generated (S860) and an overlap section is detected comparing the correction signal with the reference signal. If overlap is started (S870), the N2 counter C2 operates to count the number of overlapped pulses (S880).

Using N1, N2 and N3 counted in the N1 counter C1, the N2 counter C2 and the N3 counter C3, a transmission time of the transmission signal between the two devices is calculated (S890). Using the calculated transmission time and the speed of light, the distance is calculated (S900).

Figure 9:
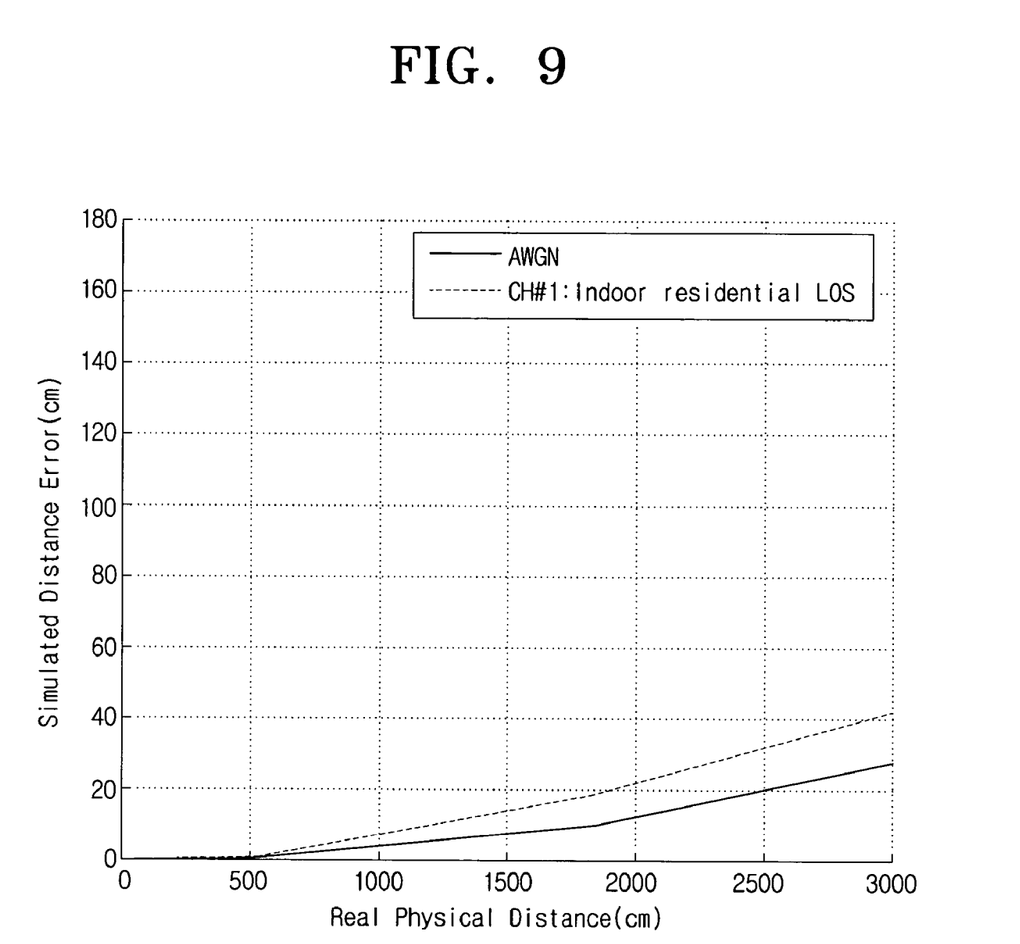
FIG. 9 is a graph showing ranging accuracy in a ranging system according to an exemplary embodiment of the present invention.

FIG. 9 is a graph showing ranging accuracy in a ranging system according to an exemplary embodiment of the present invention. The case of $f_1=2.5125$ MHz and $f_0=2.5$ MHz is shown. Referring to FIG. 9, in an error of a practical distance and a measured distance between two devices in the additive white gaussian noise (AWGN) channel and channel 1, a practical distance between two devices is proportional to an error, but the slope is gentle and an error is just a little bit.

As can be appreciated from the above description of a ranging system according to an exemplary embodiment of the present invention, 32 bits of a preamble for the transmission pulse is used so that power consumption for ranging decreases to about ⅕~⅛. When it is assumed that a transmission signal is transmitted at 2.5 Mbps, channels are occupied during 400 ns*32 bits*2(round trip)=25.6 us so that channel occupancy deceases. Additionally, because a correction signal instead of a transmission signal is used, distortion of a signal by channel distortion and noise can be minimized. Accordingly, overlapped spots can be measured accurately so that the number of overlapped signal is accurately counted and a distance between two devices can be more precisely measured.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A ranging system comprising:
a transmission signal generator which is configured to generate a transmission signal, formed of a chaotic signal, which is transmitted from a transmission device to a reception device;
a correction signal generator which is configured to convert the transmission signal, which is processed in the reception device and re-input to the transmission device, into a correction signal;
a reference signal generator which is configured to generate a reference signal to be compared with the correction signal, the reference signal having a certain frequency difference from the transmission signal;
an overlap detector which is configured to detect a pulse region where the correction signal and the reference signal overlap each other;
a time calculator which is configured to calculate a transmission time of the transmission signal between the transmission device and the reception device, using at least one among a time from the transmission of the transmission signal from the transmission device until right before overlap of a returned transmission signal and the correction signal, a time from the reception of the transmission signal at the transmission device until right before overlap of the correction signal and the reference signal, and a time while the correction signal and the reference signal overlap each other; and
a distance calculator which is configured to calculate a distance between the transmission device and the reception device using the transmission time and a transmission rate of the transmission signal.

2. The ranging system of claim 1, wherein the correction signal is a standardized waveform.

3. The ranging system of claim 1, wherein the reference signal is generated at the same time as the transmission signal.

4. The ranging system of claim 1, further comprising a synchronizer which is configured to synchronize the transmission signal to determine a start point of the transmission signal received by the transmission device.

5. The ranging system of claim 4, wherein the correction signal generator generates the correction signal with the same frequency and signal section as the transmission signal, using the start point of the transmission signal determined by the synchronizer.

6. The ranging system of claim 5, wherein the correction signal generator forms the correction signal which is a certain amount of time longer than the transmission signal.

7. The ranging system of claim 6, wherein the correction signal generator generates a correction pulse of a square wave as the correction signal.

8. The ranging system of claim 1, wherein the transmission signal generator generates a transmission pulse of a square wave as the transmission signal, and further comprises a multiplier which is configured to multiply the transmission pulse by a chaotic signal source.

9. The ranging system of claim 8, further comprising a preamble transmitter which is configured to transmit a preamble of the transmission signal generated from the transmission signal generator.

10. The ranging system of claim 9, wherein the preamble comprises:
a packet sensing part which is configured to sense a start of the transmission pulse;
a bit synchronization part which is configured to synchronize the transmission pulse; and
a notification part which is configured to show a start of a start of frame delimiter.

11. The ranging system of claim 10, further comprising a packet sensor which is configured to sense reception of a packet using the packet sensing part,
wherein the packet sensing part consists of plural '1' signals.

12. The ranging system of claim 10, wherein the bit synchronization part is formed repeating a plurality of bits of a process unit.

13. The ranging system of claim 12, wherein the plurality of bits are repeated a plurality of times.

14. The ranging system of claim 12, wherein the process unit is formed of '01111'.

15. The ranging system of claim 14, wherein the synchronizer synchronizes the preamble by processing the process unit in one of a single window method or a double window method.

16. The ranging system of claim 1, wherein the reference signal generator generates a reference pulse as the reference signal with a same signal section as the transmission signal.

17. The ranging system of claim 1, wherein the time calculator comprises:
an N3 counter which is configured to count a number of pulses (N3) from the generation of the transmission signal until right before overlap of the returned transmission signal and the correction signal;
an N1 counter which is configured to count a number of pulses (N1) from the reception of the transmission signal until right before overlap of the correction signal and the reference signal; and
an N2 counter which is configured to count a number of pulses (N2) while the correction signal and the reference signal overlap each other.

18. The ranging system of claim 17, wherein the time calculator calculates the transmission time by Equation 1:

$$T'_x = \frac{(N3 + 0.5*N2)}{f_1} - \frac{(N1 + 0.5*N2)}{f_0} - T_s$$

where $f_1$ is a frequency of the reference signal, $f_0$ is a frequency of the transmission signal, and $T_S$ is a time to execute synchronization in the synchronizer.

19. The ranging system of claim 18, wherein the distance calculator calculates the distance between the transmission device and the reception device by Equation 2:

$$S = 0.5*c*(T'_x - \tau_0)$$

where $\tau_0$ is a processing time required by the reception device.

20. The ranging system of claim 19, wherein the processing time is a time from reception of the transmission signal at the reception device to re-transmission of the transmission signal.

21. A ranging method comprising:
generating a transmission signal, which is formed of a chaotic signal, and a reference signal having a certain frequency difference from the transmission signal;
transmitting the transmission signal to a reception device;
receiving the transmission signal from the reception device;
converting the transmission signal which is received from the reception device into a correction signal;
comparing the correction signal and the reference signal, and detecting a pulse region where the correction signal and the reference signal overlap each other;
calculating a transmission time of the transmission signal between the transmission device and the reception device, using at least one among a time from the transmission of the transmission signal from the transmission device until right before overlap of the received transmission signal and the reference signal, a time from the reception of the transmission signal at the transmission device until right before overlap of the correction signal and the reference signal, and a time while the correction signal and the reference signal overlap each other; and
calculating a distance between the transmission device and the reception device using the transmission time and a transmission rate of the transmission signal.

22. The ranging method of claim 21, wherein the correction signal is of a standardized waveform.

23. The ranging method of claim 21, wherein the reference signal is generated at the same time as the transmission signal.

24. The ranging method of claim 21, further comprising synchronizing the transmission signal to determine a start point of the transmission signal received by the transmission device.

25. The ranging method of claim 21, wherein converting the transmission signal into the correction signal generates the correction signal with a same frequency and signal section as the transmission signal, using the start point of the transmission signal.

26. The ranging method of claim 25, wherein converting the transmission signal into the correction signal forms the correction signal which is a certain amount of time longer than the transmission signal.

27. The ranging method of claim 26, wherein the correction signal is a correction pulse and is a square wave.

28. The ranging method of claim 21, wherein the transmission signal is a transmission pulse and is a square wave, and
generating the transmission signal comprises selecting a preamble from the transmission pulse.

29. The ranging method of claim 28, wherein generating the transmission signal further comprises forming the preamble by sensing a start of the transmission pulse, synchronizing the transmission pulse, and showing a start of a start of frame delimiter.

30. The ranging method of claim 29, wherein synchronizing the transmission pulse synchronizes the preamble by processing in one of a single window method or a double window method.

31. The ranging method of claim 21, wherein calculating the transmission time comprises:
counting a number of pulses (N3) from the generation of the transmission signal until right before overlap of the received transmission signal and the correction signal;
counting a number of pulses (N1) from the reception of the transmission signal until right before overlap of the correction signal and the reference signal; and
counting a number of pulses (N2) while the correction signal and the reference signal overlap each other.

32. The ranging method of claim 31, wherein calculating the transmission time calculates the transmission time by Equation 1:

$$T'_x = \frac{(N3 + 0.5*N2)}{f_1} - \frac{(N1 + 0.5*N2)}{f_0} - T_s$$

where $f_1$ is a frequency of the reference signal, $f_0$ is a frequency of the transmission signal, and $T_S$ is a time to synchronize.

33. The ranging method of claim 32, wherein calculating the transmission time calculates the distance between the transmission device and the reception device by Equation 2:

$$S = 0.5*c*(T'_x - \tau_0)$$

where $\tau_0$ is a processing time required by the reception device.

34. The ranging method of claim 33, wherein the processing time is a time from reception of the transmission signal at the reception device to re-transmission of the transmission signal.

* * * * *